(12) United States Patent
Wieder

(10) Patent No.: US 7,097,353 B2
(45) Date of Patent: Aug. 29, 2006

(54) METHOD AND DEVICE FOR INDICATING TEMPERATURE

(76) Inventor: Horst K. Wieder, N8557 Hwy. E., Watertown, WI (US) 53094

( * ) Notice: Subject to any disclaimer, the term of this patent is extended or adjusted under 35 U.S.C. 154(b) by 91 days.

(21) Appl. No.: 10/711,896

(22) Filed: Oct. 12, 2004

(65) Prior Publication Data

US 2006/0078036 A1 Apr. 13, 2006

(51) Int. Cl.
G01K 1/00 (2006.01)
G01K 13/20 (2006.01)
G01K 5/08 (2006.01)
G01K 11/06 (2006.01)

(52) U.S. Cl. ............. 374/156; 374/208; 374/190; 374/160; 116/228; 116/216

(58) Field of Classification Search ........... 374/101, 374/105, 208, 156, 201, 190; 116/216, 107, 116/102, 101, 228
See application file for complete search history.

(56) References Cited

U.S. PATENT DOCUMENTS

| | | | | | |
|---|---|---|---|---|---|
| 1,519,214 | A | * | 12/1924 | Moore | 116/228 |
| 1,526,850 | A | * | 2/1925 | Davis et al. | 73/447 |
| 2,004,092 | A | * | 6/1935 | Chaney | 374/156 |
| 2,043,405 | A | * | 6/1936 | Edelmann | 73/442 |
| 2,102,678 | A | * | 12/1937 | Campbell | 374/104 |
| 2,370,968 | A | * | 3/1945 | Kahl | 374/104 |
| 2,552,477 | A | * | 5/1951 | Cole | 374/102 |
| 2,691,892 | A | * | 10/1954 | Broad | 374/105 |
| 2,788,282 | A | | 4/1957 | Hammond, Jr. | 99/192 |
| 2,847,067 | A | | 8/1958 | Brewer | 161/15 |
| 2,856,930 | A | | 10/1958 | Huyck | 128/272 |
| 2,915,405 | A | * | 12/1959 | Hammond, Jr. et al. | 116/218 |
| 2,983,247 | A | | 5/1961 | Greenspon | 116/106 |
| 3,015,954 | A | * | 1/1962 | Dalglish | 374/116 |
| 3,054,293 | A | * | 9/1962 | Friedrichs | 374/104 |
| 3,063,235 | A | | 11/1962 | Winchell | 58/144 |
| 3,518,961 | A | | 7/1970 | Kovac | 116/114.5 |
| 4,137,049 | A | * | 1/1979 | Couch et al. | 422/56 |
| 4,187,799 | A | | 2/1980 | Zwarum | 116/217 |
| 4,434,650 | A | * | 3/1984 | Perry et al. | 73/61.51 |
| 4,457,253 | A | * | 7/1984 | Manske | 116/216 |
| 4,488,822 | A | * | 12/1984 | Brennan | 374/101 |
| 4,627,741 | A | * | 12/1986 | Faller | 374/104 |
| 4,664,056 | A | * | 5/1987 | Jehanno | 116/217 |
| 4,893,477 | A | | 1/1990 | Vazquez | 62/125 |
| 4,941,425 | A | | 7/1990 | Holzer | 116/217 |
| 5,215,378 | A | * | 6/1993 | Manske | 374/105 |
| 5,301,632 | A | | 4/1994 | Cayol | 116/217 |

(Continued)

FOREIGN PATENT DOCUMENTS

JP 06213729 A * 8/1994

Primary Examiner—Gail Verbitsky
(74) Attorney, Agent, or Firm—John K. McCormick

(57) ABSTRACT

Disclosed is a temperature indicating method and device. The device embodies a sealed tube containing a liquid and a float. The tube has markings on the exterior indicating temperature zones or, in the alternative, temperature gradients. The method disclosed includes inverting the tube such that the indicator drops to the bottom of the tube and freezing the device at the appropriate temperature level. In use, the device is placed right side up in a container along with other items for which the highest temperature level arrived at is desired to be known. Upon warming, the liquid in the tube melts and the float drops through the liquid to the freezing level of the liquid. By removing the device from the container and comparing the float level in the tube to the markings on the exterior of the tube, the highest temperature or temperature zone that the contents of the container were subjected can be determined.

4 Claims, 3 Drawing Sheets

U.S. PATENT DOCUMENTS

| | | | |
|---|---|---|---|
| 5,404,834 A * | 4/1995 | Murphy | 116/216 |
| 5,531,180 A | 7/1996 | Bianchini | 116/216 |
| 5,964,181 A * | 10/1999 | Pereyra et al. | 116/216 |
| 6,302,054 B1 * | 10/2001 | Mayer, III | 116/216 |
| 6,422,746 B1 * | 7/2002 | Weiss et al. | 374/156 |
| 6,837,620 B1 * | 1/2005 | Shahinpoor | 374/205 |
| 2005/0232335 A1 * | 10/2005 | Saravanan et al. | 374/201 |

* cited by examiner

METHOD AND DEVICE FOR INDICATING TEMPERATURE

FIELD OF INVENTION

This invention relates generally to the field of temperature indicators and more particularly to the field of temperature indicators used in monitoring materials kept at assured temperatures.

BACKGROUND OF THE INVENTION

In many fields of endeavor, such as in medicine, biological research, animal husbandry and other areas, there is a need to genetically stabilize, store and/or safely transport materials to offsite locations. These materials can include a wide variety of items, such as cultures of viruses and bacteria, tissue cells, multi-cellular organisms, enzymes, human and animal DNA, vaccines, diagnostic substrates, embryos, spermatozoa and a host of other materials.

In general, the process of genetically stabilizing organic or biological materials has been accomplished by containing the chosen materials in enclosures wherein cryogenic temperatures are maintained at or near liquid nitrogen or vapor phase liquid nitrogen temperatures. At a fixed location, there are currently means available to store and assure that the materials are properly and safely stored. However, when it is desired and/or necessary to transport the chosen materials to offsite locations, many problems and concerns arise. The biological materials must be transported at cryogenic temperatures to maintain viability. This requires a shipping container that can maintain a cryogenic environment for the duration of the transportation time and a means to assure that the contents of the shipper have stayed at or below a preset temperature level during the course of transportation.

As an example only, in the field of animal husbandry today, most domesticated animals, such as cows, turkeys and other animals, are artificially inseminated. In practice the sperm is collected and stored in what is known as straws. The straws are sealed, labeled and placed in a cylindrical tube. The tube is placed into a holder with the proper identification so that the person using the sperm to inseminate their animals can verify the origin of the sperm. The straws, tube and tube holder are then cryogenically stored in a container. This container has a compartment for holding the tubes and the compartment is surrounded by liquid nitrogen. The liquid nitrogen is contained by the container. To maintain the viability of the sperm, the sperm should be kept at temperature colder than minus 50 degrees centigrade. However, in practice most suppliers and users of animal sperm recommend that the sperm be kept no warmer than minus 90 degrees centigrade to assure the viability of the sperm.

To assure the end user that the temperature of the sperm has not dropped below a preset minimum, the shipping container that contains the tubes containing sperm straws also contains a device that acts as a temperature indicator. Today, the temperature indicator tube has two separate, partially liquid filled ampoules, one of the capsules is red in color and the other is blue. The red and blue capsules act as a go—no go indicator to assure the user that the frozen sperm has not dropped below a specified temperature, typically minus 90 degrees centigrade for the blue color and minus 50 degrees centigrade for the red color. If the blue liquid in the ampoule drops a certain amount, that is ok and the sperm is still viable. However, if the red ampoule drops then there is a problem with the temperature being below the desired threshold and the sperm is viewed as being: suspect.

Once a user chooses the type and quantity of sperm they need for their operations, the sperm supplier packages the sperm straws in the tubes and place the tubes in the containers with liquid nitrogen and the current temperature indicator and transports them offsite. As the container travels to its end destination, the container and its contents gets warmer and some of the liquid nitrogen evaporates off. In order not to create a buildup of pressure within the container, each container has a vent to release any nitrogen vapors. This creates a shipping problem as liquid nitrogen is a hazardous material when in liquid form. If the container should happen to tip over during transit, the liquid nitrogen could spill out through the vent hole, thereby causing a hazardous material (extreme cold) spill along with the potential for destroying the viability of the sperm.

Once the shipping container arrives at its destination, the user opens up the container and checks the temperature indicator to assure the viability of the sperm through the use of the colored go—no go type ampoule positions. Currently, this is a simple yes—no answer, the contents are either viable or not. The problem with the existing art is that it presents a simple go—no go gage for determining the viability of the contents of the container, whereas, in fact, there is a range of temperatures within which the contents of the container remain viable. As such, the existing art provides no means to determine the actual range of temperatures or actual temperature that the contents of the container reached over time and the possible viability of the contents. The new invention solves this problem.

DESCRIPTION OF THE DRAWINGS

The features and advantages of the invention can be gathered from the following description relative to the attached drawings, wherein.

DETAILED DESCRIPTION OF THE INVENTION

Reference will now be made in detail to the description of the invention as illustrated in the attached drawings. Although the invention will be described in connection with these drawings, there is no intent to limit the invention to the embodiment or embodiments disclosed herein. Rather, the intent is to include all alternatives, modifications and equivalents included within the spirit and scope of the invention as defined by the appended claims.

To aid in the understanding of the invention, examples from the area of animal husbandry are provided for clarification purposes. These examples are not meant to limit the scope of the invention to the field of animal husbandry, but rather to include any other field of use and any alternative, modification and equivalents included within the spirit and scope of the invention as defined by the appended claims.

Figure 1:
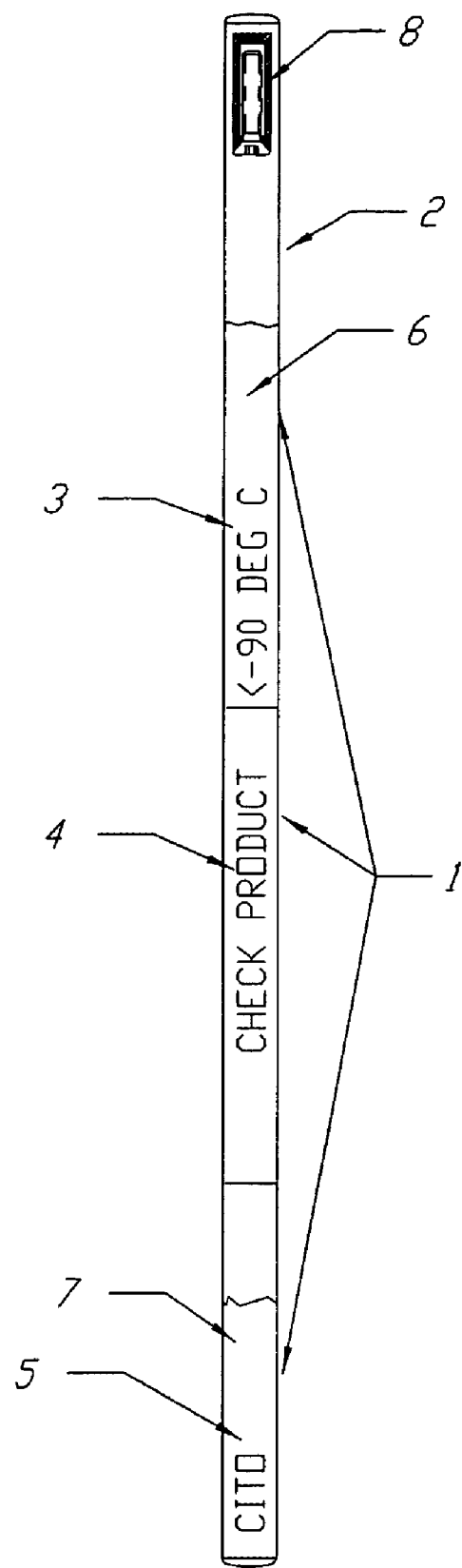
FIG. 1 is a frontal view showing a temperature indicating device constructed in accordance with the concept of my invention when it is in a frozen state.

Referring now to FIG. 1, the temperature indicator 1 is shown in a frozen ready to use state. The temperature indicator 1 is a sealed cylinder 2 made of a transparent material such as tempered glass or the like. On the outside of the sealed cylinder 2 are three printed areas. The upper printed area 3 has a dashed line going partway around the sealed cylinder 2 printed in green and the lettering "<−90 DEG C" printed multiple times in green color. The middle printed area 4 has a red dashed line going partway around the sealed cylinder 2 and the lettering "CHECK PRODUCT" printed multiple times in red color. The lower printed area 5 has general information about the manufacturer of the temperature indicator printed in black color. In the alternative, different colors for the printing in each of the areas 3, 4 and 5 could be utilized.

The inside of the sealed cylinder 2 is filled mostly with a liquid 6 with the desired freeze point, although there is some air space 7 as well. There is also a float mechanism 8 on the inside top of the sealed cylinder 2.

Figure 2:
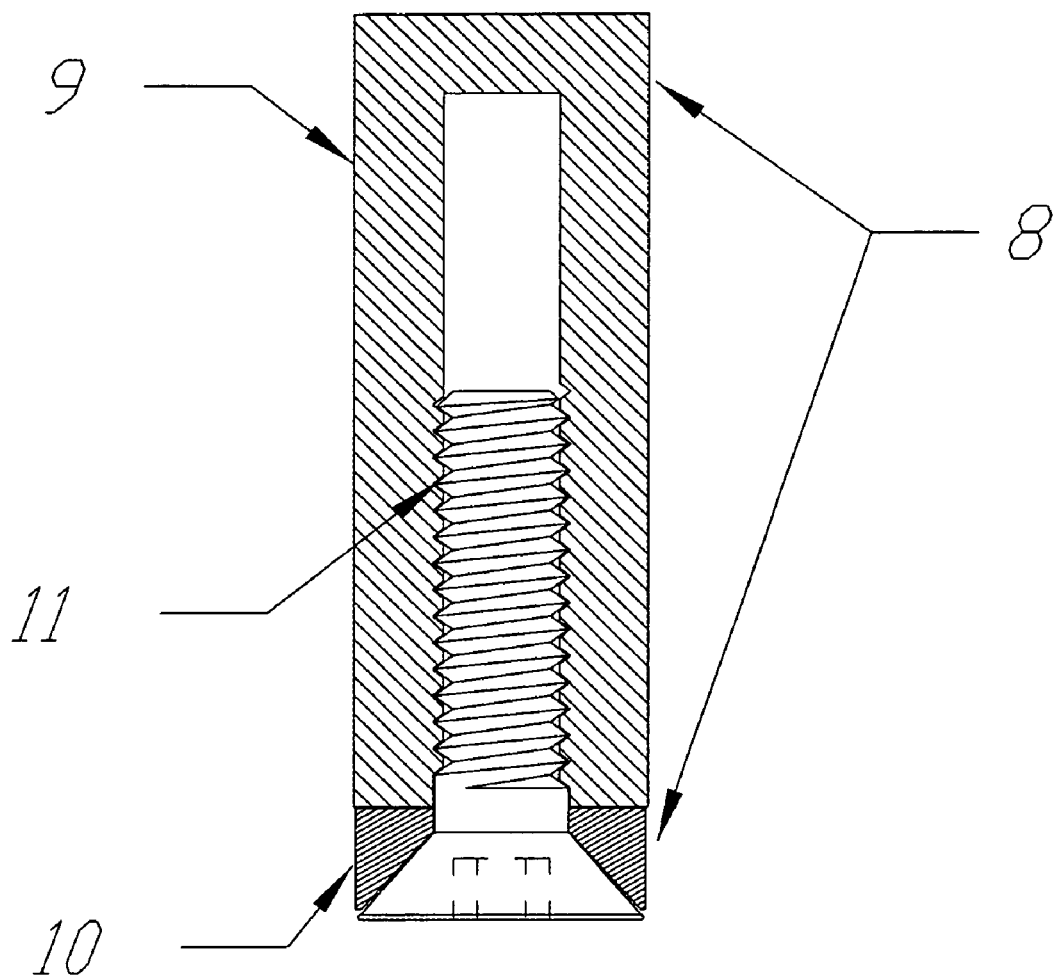
FIG. 2 is a cross sectional view of the of the float assembly.
Figure 2:
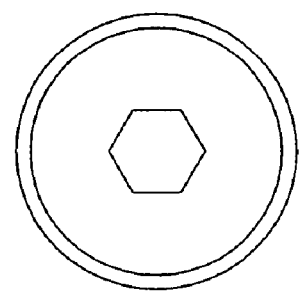

FIG. 2 is a detailed depiction of the float mechanism 8. The float mechanism 8 includes a closed cell foam material 9 that acts as a float. There is also indicator ring 10 that aids in determining the position of the temperature indicator. There is a screw 11 that secures the indicator ring 10 to the closed cell float 9. The screw 11 and ring 10 also act as a weight to pull the float down through the liquid 6 (not shown in FIG. 2).

Figure 3:
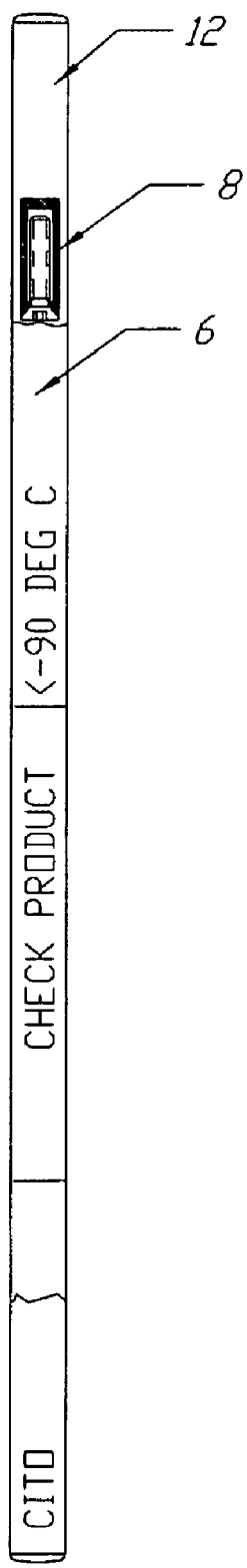
FIG. 3 is a frontal view showing a temperature indicating device constructed in accordance with the concept of my invention when it is in a partially thawed state.

FIG. 3 is a depiction of the temperature indicator 1 in a partially thawed state. The frozen liquid 6 is beneath the float mechanism 8. The thawed liquid 12 is above the float mechanism 8 as the float mechanism 8 has dropped through the thawed liquid 12.

The use of the device is as follows. The temperature indicator 1 is turned upside down, the float 8 falls through the liquid 12 and the temperature indicator 1 is cryogenically frozen at a temperature below minus 90 degrees centigrade. At this temperature the liquid 6 freezes, keeping the float 8 held in position at the top of the temperature indicator 1. Once the temperature indicator is frozen, it is removed from the cold source and placed with the top of the temperature indicator 1 upright into a cryogenic shipper along with the other contents.

As the cryogenic shipper travels over time to its final destination, the cryogenic shipper can lose some of its temperature as it warms up. As this occurs, the inside of the shipping container gets warmer and the frozen liquid 6 starts to melt. As the frozen liquid 6 melts, the float 8 drops slowly through the liquid 12 but stays above the frozen liquid 6.

When the shipping container arrives at its destination, the user opens up the shipping container and removes the temperature indicator 1. The user then looks at the position of the float 8 in the temperature indicator 1. If the indicator ring 10 on the float 8 is in the upper printed area 3, then the temperature indicator 1 and the other contents of the shipping container have remained at or below minus 90 degrees centigrade. If the indicator ring 10 on the float 8 is in the middle printed are 4, then the temperature indicator 1 and the other contents of the shipping container have warmed up—the float mechanism 8 has dropped to the same freezing level as the contents.

If the temperature range is not within the desired level, then the other contents of the shipping container should be checked and tested for viability.

If the indicator ring 10 on the float 8 has dropped to the lower printed area 5 in the temperature indicator 1, then the temperature indicator 1 and the other contents of the shipping container has risen above minus 90 degrees centigrade.

If the liquid 12 in the temperature indicator 1 has partially or completely melted and the float 8 dropped to some lower level within the temperature indicator 1 and then been refrozen without turning the temperature indicator upside down, then the float 8 will be frozen in suspension somewhere at whatever lower temperature the shipping container contents and the temperature indicator 1 reached prior to refreezing. As such, if the contents of the shipping container were warmed up and then refrozen, a user would know by viewing the temperature indicator 1 if the contents of the shipping container had risen above a preset minimum required temperature, even though the contents were refrozen.

Once the contents of the shipping container have been used, consumed or stored in another storage container, the temperature indicator can be turned upside down, refrozen and reused over and over again.

In another embodiment, the exterior of the temperature indicator could be marked in graduations that indicated the actual temperature levels that the float has reached. In another embodiment, the liquid 6 could be replaced with a different liquid that has a different freezing or solidification temperature and the temperature indicator 1 utilized for monitoring the temperature levels of items other than those stored cryogenically.

What is claimed is:

1. A temperature indicator comprising:
   a. a tube which is at least partially transparent;
   b. said tube having printing and markings on the exterior of the tube indicating various temperature level ranges;
   c. said tube substantially filled with a substance that thaws at a desired temperature-; and
   d. said tube containing a float, wherein said float comprises:
      i. a closed cell foam for float material;
      ii. an indicator ring adjacent to one end of said float material; and
      iii. a screw that acts as a weight for said float and secures said indicator ring to said float material.

2. The temperature indicator according to claim 1, wherein said printing includes graduations between said markings which when read in conjunction with the position of said indicator ring determines the actual temperature level said temperature indicator reached.

3. A method for monitoring and verifying the temperature of the contents of a container over time, comprising the steps of:
   a. sealing a liquid and a float inside of a tube that is at least partially transparent, wherein said float comprises;
      i. a closed cell foam for float material;
      ii. an indicator ring adjacent to one end of said float material; and
      iii. a screw that acts as a weight for said float and secures said indicator ring to said float material;
   b. marking the exterior of said tube with temperature zones;
   c. turning said tube upside down so that said float falls down to the top of said tube;
   d. freezing said liquid in said tube by reducing the temperature to less than the desired freezing level;
   e. placing said frozen tube top side up in a container;
   f. removing said tube from said container at a later point in time;
   g. viewing the position of said indicator ring in said tube relative to said temperature zone markings to determine the temperature of the inside of said container; and
   h. repeating step e to conclude temperature measurements.

4. The method according to claim 3, wherein said marking on the exterior of said tube includes graduations between said markings which when read in conjunction with the position of said indicator ring determines the actual temperature levels said temperature indicator reached.

* * * * *